United States Patent [19]
Yoda et al.

[11] Patent Number: 5,912,790
[45] Date of Patent: Jun. 15, 1999

[54] THIN FILM MAGNETIC RECORDING-REPRODUCING HEAD HAVING A HIGH RECORDING DENSITY AND HIGH FIDELITY

[75] Inventors: Hiroaki Yoda; Akio Hori; Michiko Hara; Naoyuki Inoue, all of Kanagawa-ken; Yuichi Ohsawa, Tokyo; Susumu Hashimoto, Kanagawa-ken; Takeo Sakakubo, Kanagawa-ken; Norio Ozawa, Kanagawa-ken; Teruo Sasho, Ohita-ken, all of Japan

[73] Assignee: Kabushiki Kaisha Toshiba, Kawaski, Japan

[21] Appl. No.: 08/818,110

[22] Filed: Mar. 13, 1997

[30] Foreign Application Priority Data

Mar. 15, 1996 [JP] Japan .................................. 8-059841

[51] Int. Cl.[6] ............................ G11B 5/127; G11B 5/187
[52] U.S. Cl. ........................................... 360/113; 360/122
[58] Field of Search ............................ 360/119–120, 122, 360/126, 113

[56] References Cited

U.S. PATENT DOCUMENTS

| | | | |
|---|---|---|---|
| 5,349,745 | 9/1994 | Kawabe et al. | 360/126 X |
| 5,652,687 | 7/1997 | Chen et al. | 360/126 |
| 5,667,879 | 9/1997 | Haji-Sheikh | 360/113 X |
| 5,700,380 | 12/1997 | Krounbi et al. | 360/113 X |
| 5,729,410 | 3/1998 | Fontana, Jr. et al. | 360/113 |

*Primary Examiner*—John H. Wolff
*Attorney, Agent, or Firm*—Finnegan, Henderson, Farabow, Garrett & Dunner, L.L.P.

[57] ABSTRACT

A composite magnetic head includes a recording head and a reproducing head. The recording head may be formed below or above the reproducing head. The lower of the recording and reproducing heads includes a first electrode. In addition, a conductive layer acting as a pole structure for the recording head includes a portion defining a hole through which a second electrode is made to contact the first electrode.

15 Claims, 12 Drawing Sheets

THIN FILM MAGNETIC RECORDING-REPRODUCING HEAD HAVING A HIGH RECORDING DENSITY AND HIGH FIDELITY

BACKGROUND OF THE INVENTION

1. Field of the Invention

The present invention relates to a magnetic recording-reproducing head and to a method for making the magnetic recording-reproducing head, and more particularly to a thin-film magnetic head.

2. Description of the Related Art

The magnetic recording-reproducing head has an increasing range of application for audio and video recording as well as various information processing purposes. The magnetic recording-reproducing head should record and reproduce as much information in as small an area of the recording medium as possible (high recording density) with high fidelity. Recent achievements enabled the recording-reproducing density of a VTR to be 500 Mb/inch$^2$, and that of a HDD to be 200Mb/inch$^2$.

A reproducing magnetic head using a Magneto-Resistive effect has been known for its high density and high fidelity. The magneto-resistive effect refers to the change of electric resistance of magnetic thin film or magnetic multi-layered film by the outer magnetic field. This MR head is able to gain high output even if it is used in a system in which the relative speed of the magnetic reproducing head and magnetic media is low.

FIG. 1D shows the basic composition of a magnetic recording-reproducing head 15 comprising the MR reproducing head 8 with lower and upper magnetic shield layers 2,7 and a magnetic inductive recording head 14 built on the MR reproducing head 8.

FIG. 1A to FIG. 1D shows the steps required to manufacture the magnetic recording-reproducing head 15.

A soft magnetic film which serves as the lower magnetic shield layer 2 is sputtered and patterned above the main surface of the Al$_2$O$_3$. TiC substrate 1 covered with Al$_2$O$_3$ film. Then the lower gap material layer 3 of the MR head 8 and the MR film 4 comprised of AMR(Anisotropic MR) film or GMR(Giant MR) film is sputtered and patterned on the lower magnetic shield layer 2. After the patterning of the MR film 4, a pair of lead electrodes 5 is made from each end portion of the MR film 4 to the region recessed from the ABS(Air Bearing Surface), as shown in FIG. 1A.

The upper gap layer 6 and soft magnetic layer 7 constituting both the upper magnetic shield layer and lower pole layer of the magnetic inductive recording head are then sputtered and patterned, as shown in FIG. 1B.

Next, gap layer 9 is sputtered on the patterned lower pole layer 7, as shown in FIG. 1C, and both a planar type magnetic recording coil 10 and a pair of deposited electrodes 11, each connecting to the lead electrodes 5 is then gilted using a resist pattern made by PEP(Photo Etching Process) as a resist flame pattern.

A coil insulator 12 which covers the recording coil 10 is then plastered or deposited by a CVD(Chemical Vapor Deposition) process and patterned, and a soft magnetic layer serving as an upper pole layer 13 which covers the magnetic recording gap 9 in the area including the ABS is applied as shown in FIG. 1D. The protective insulator layer is then sputtered, and the ABS of the head is cut out from wafer and polished.

SUMMARY OF THE INVENTION

According to the related art of the method for manufacturing the magnetic recording-reproducing head, there is a structural step originated in the pattern of the lower layer, such as magnetic shield layer 7, which is made for the drawing electrode before making the recording coil and upper pole structure, and has an altitude of at least 3 μm~5 μm. The structural step leads to the deterioration of the preciseness and minuteness of the resist pattern used as mask patterning of the recording coil, and low yield of production. Specifically, the structural step cause the resist layer to thicken and to have an non-uniformity of thickness. The thickness of the resist layer and the non-uniformity of the thickness make it difficult to make precise and minute resist patterns suited for high recording density.

The same problems occurs on the patterning of the upper recording pole layer 13, especially the pole tip region. At the step of the patterning of the upper recording pole layer 13, there are structural steps whose altitude amounts to at least 10~15 μm. Those steps are of the pattern of the recording coil 10 whose altitude is at least 3~5 μm, the lower pole layer 7 whose altitude is at least 3~5 μm, and the lower shield layer 2 whose altitude is at least 3~5 μm. Under these conditions, it is difficult to obtain preciseness and minuteness in the resist pattern, which fixes the pattern of the upper recording pole layer 13. The tip portion of the pole layer, which mainly determines the track width of the magnetic recording is required to be precise and minute. This is especially true for the tip portion of the pole layer of the recording head, which must correspond to a high recording density of more than 2 Gbpsi(bit per square inches).

The present invention offers a solution of these former problems. Specifically, the present invention provides a magnetic recording-reproducing head which will achieve high density, high fidelity, and high productivity.

According to a first embodiment of the present invention, the method for manufacturing a magnetic recording-reproducing head comprises the steps of: forming a first electrode of a first magnetic head, which is either the magnetic recording head or magnetic reproducing head; making the first magnetic head; making a second magnetic head over a first magnetic head; then defining a hole or step through a conductive layer extending between the first and second magnetic head to surface of the electrode; making insulator film attached to surface of side wall of the hole; and depositing a drawing second electrode electrically connecting to the first electrode.

Further according to the first embodiment for the method for manufacturing a magnetic recording-reproducing head, the step of making the first magnetic head comprises the steps of depositing MR film, connecting to a pair of lead electrodes to each end of the MR film, and depositing gap material layer. The step to make the second magnetic head comprises the steps of forming a pair of pole structures, depositing a gap material layer maintained between the pair of pole structures, and make a recording coil after the step to make the portion defining hole or step.

Further according to the first embodiment for the method for manufacturing magnetic recording-reproducing head, the step to make the first magnetic head comprises the steps of depositing a MR film, connecting a pair of lead electrodes connecting to an end of the MR film, and depositing a gap material layer. The step to make the second magnetic head comprises the steps of making at least the tip portion of the pair of pole structures before defining the hole or step, forming a gap material layer maintained between the pole structures, and making a recording coil.

Further according to the first embodiment, the step to make the first magnetic head comprises the steps of making a pair of pole structures, depositing a gap material layer maintained between the pole structures, and making a recording coil. The step to make the second head comprises steps of depositing MR film, and connecting a pair of second electrodes to the first electrode before defining the hole or step.

According to the second embodiment of the present invention, the magnetic recording-reproducing head, comprises: a first magnetic head which is either of magnetic recording head or magnetic reproducing head, an electrode of the first head, a second magnetic head which is the other magnetic recording head or the magnetic reproducing head made over the first head, a hole made through the element of the second magnetic head to the surface of the electrode of the first magnetic head, and a second electrode connecting to the first electrode.

Further according to the second embodiment of the present invention, a magnetic recording-reproducing head; the first magnetic head is the reproducing head and comprises MR film, the first electrode is a pair of lead electrodes, the second magnetic head is the recording head consisting of a recording coil, pair of pole structures, and a gap layer maintained between the pair of pole structures.

Further according to the second embodiment of the present invention for a magnetic recording-reproducing head, the pair of pole structures has a first portion of pole tip at an area including a Air Baring Surface and a second portion, wider than the first portion, connecting to the first portion.

Further according to a preferred embodiment of the present invention, the second portion is recessed from the ABS surface.

Further according to the second embodiment of the present invention for a magnetic recording-reproducing head, the first magnetic head is the recording head and comprises a recording coil, a pair of pole structures, and a gap layer maintained between the pair of pole structures, the first electrode is connected with the end portions of the recording coil. The second magnetic head is the reproducing head and has MR film and pair of lead electrodes connecting to each end of the MR film.

In the present invention, precision and minuteness of the pattern of important elements, such as the recording coil, the pole structure, and the lead electrode of the first magnetic head can be obtained. Because the surface on which the important elements are deposited is flatter than the surface offered by the related art, the resist pattern for making the important element can be precise and minute without deterioration of the pattern form.

BRIEF DESCRIPTION OF DRAWINGS

The present invention will be more apparent from the following detailed description, when taken in conjunction with the accompanying drawings, in which.

DESCRIPTION OF PREFERRED EMBODIMENTS

Figure 1A:
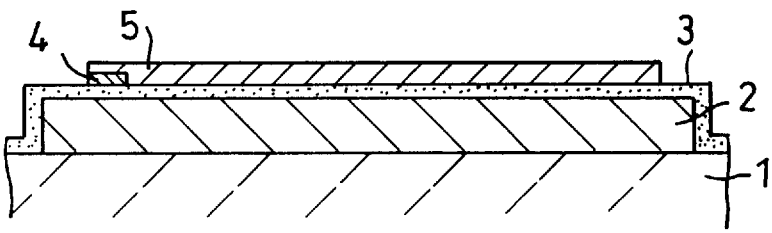
FIGS. 1A, 1B, 1C, and 1D comprise cross sectional views of thin film magnetic heads showing steps in the process according to the conventional method.
Figure 1B:
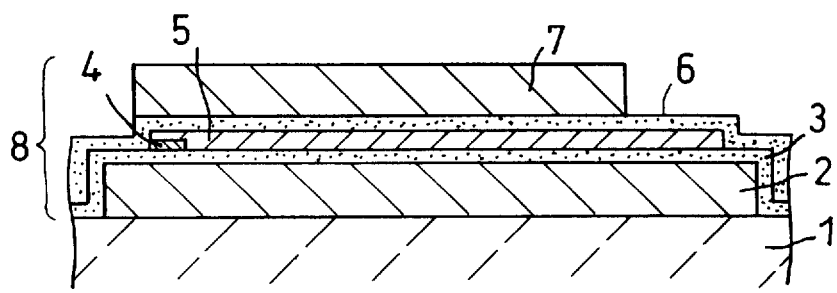
Figure 1C:
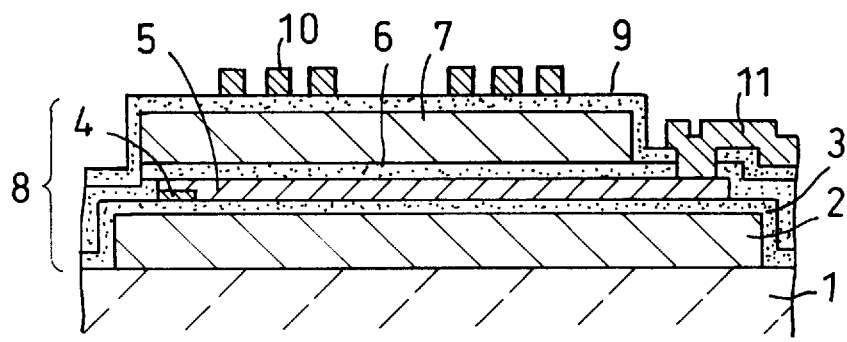
Figure 1D:
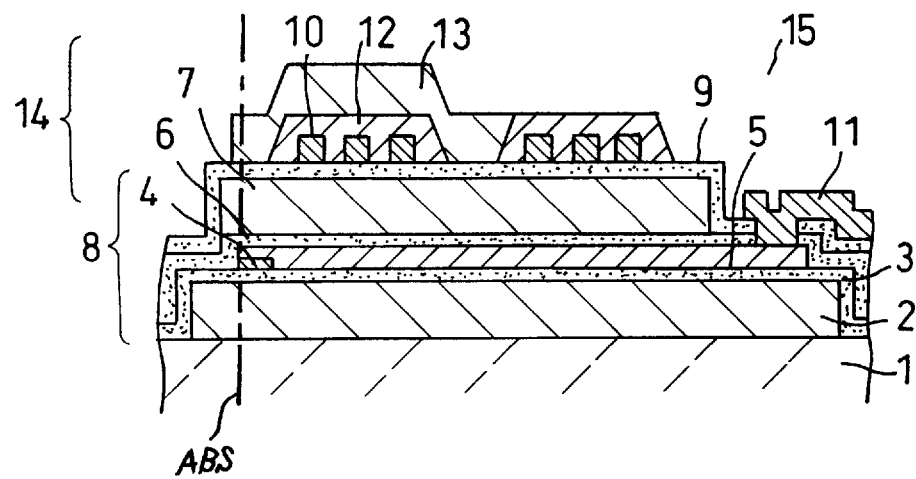
Figure 2:
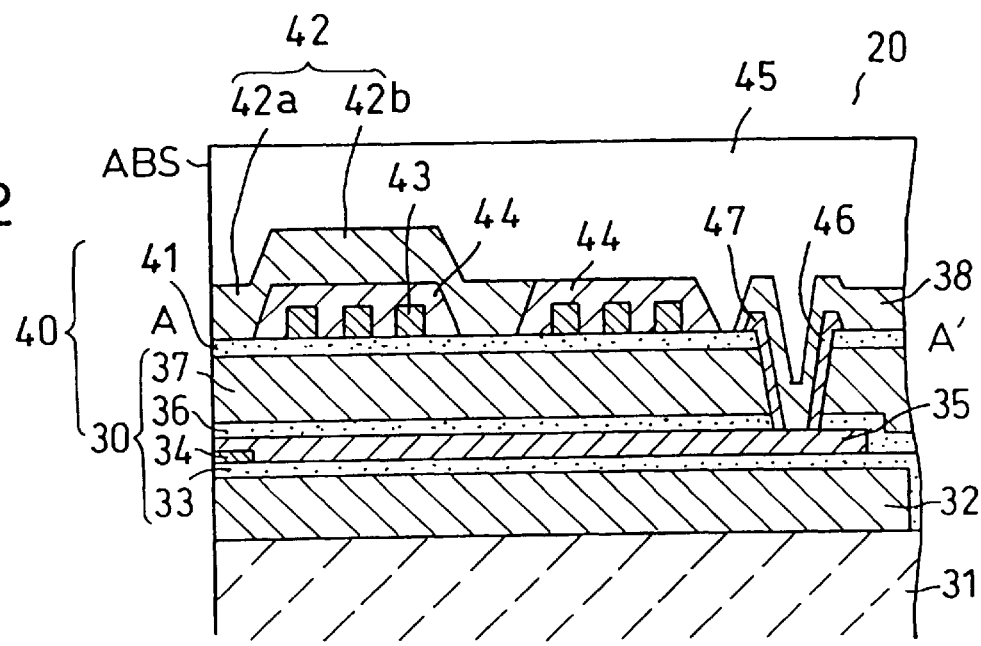
FIG. 2 is a cross sectional view of first example of the second aspect of the present invention, a recording-reproducing head.
Figure 3:
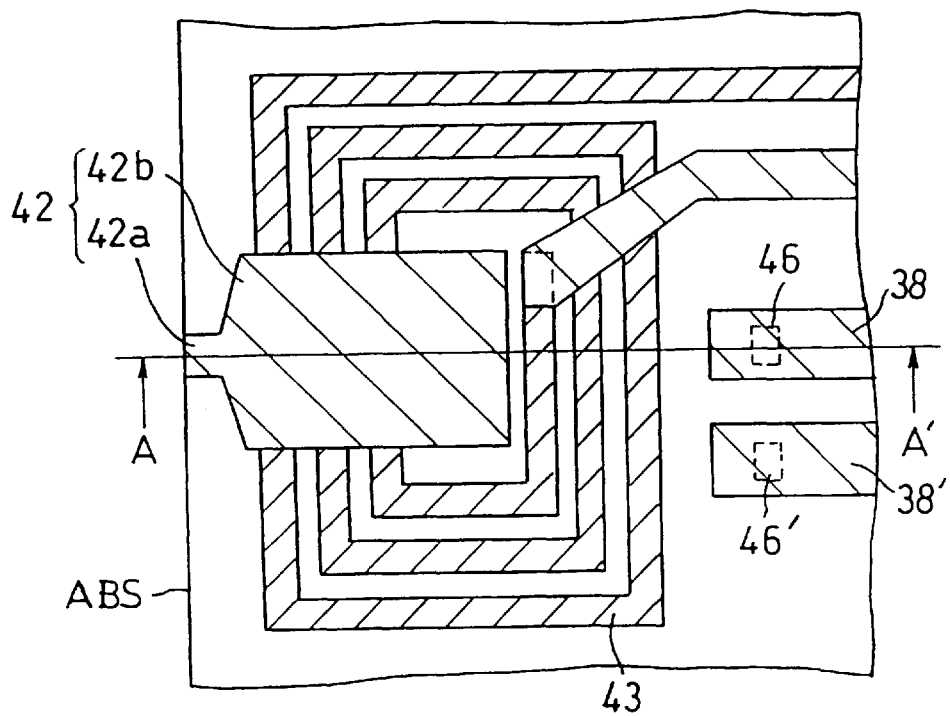
FIG. 3 shows the relative relation of location of some elements in the first example, and a plan view of the specific embodiment of the magnetic recording-reproducing head.

FIG. 2 shows a cross sectional view shown as A-A' in FIG. 3 of the magnetic recording-reproducing head according to the first example of the first aspect of the present invention, and FIG. 3 shows a plane view of the mutual relation of the recording coil 43, upper pole layer 42, and holes 46,46' for depositing electrode 38,38'. As shown in FIG. 2 and FIG. 3, an inductive type of magnetic recording head 40 is made on a shield type magnetic reproducing head 30.

The shield type magnetic reproducing head 30 comprises a lower magnetic shield layer 32 formed over the main surface of an $Al_2 O_3$. TiC substrate 31 whose surface is coated with an $Al_2 O_3$ layer, a lower reproducing gap material layer 33 formed on the lower shield layer 32, an MR film 34 made in a specific area including the ABS prearranged on the lower gap material layer 33, a pair of lead electrodes 35, each of which connects to an end of the MR film 34 and sends sensing current to the MR film 34, upper reproducing gap material layer 36 formed over the MR film 34 and the pair of lead electrodes 35, and an upper magnetic shield layer 37 formed over the upper gap material layer 36.

The inductive type magnetic recording head 40 comprises a lower magnetic pole layer 37 which is simultaneously the upper magnetic shield layer 37, a recording gap material layer 41 formed over the lower pole layer 37, a recording coil 43 formed over the reproducing gap material layer 41, a coil insulator 44 coated over the recording coil 43, and an upper pole structure 42 which is formed over the coil insulator 44, and on the magnetic recording gap layer 41 in the pole tip region that includes ABS. The upper magnetic pole layer 42 of the magnetic recording head, is coated with an insulator 45 for protection.

The upper pole layer 42 and the lower pole layer 37 form the magnetic circuit by joining with each other at the ABS through the recording gap layer 41 and at back gap region receding from ABS. The recording coil 43 is given an electric current and generates the magnetic field to the magnetic circuit.

The upper pole layer 42 comprises a first portion 42a which shapes the pole tip, mainly the extreme point of the pole structure 42 including the ABS, and a second portion 42b extending from the part connected with the first portion 42a to the receded junction at which it joins with the lower pole layer 37.

There are two holes 46,46' which connect each one of the pair of lead electrodes 35. A pair of drawing electrodes 38,38' made, in the two holes 46,46' draws each one of the pair of the lead electrodes 35 and are connected to an outer control circuit which supplies sensing electric current to the MR film 34 through the pair of lead electrodes 35. The holes 46,46' are patterned through the recording gap material layer 41, the lower pole layer 37, and the upper reproducing gap material layer 36 at the receded area from an important position relating to recording at the ABS. In this embodiment; the lower pole layer 37 is made of the conductive material layer, and the surface of the side wall of the pair of holes is covered with insulator film 47 which insulates between the conductive material of the lower pole layer 37 and the drawing electrodes 38,38'.

An narrow and precise pattern of the coil 43 is desired for the reason described above. In this embodiment, the holes 46,46' are patterned through the recording gap material layer 41 on which the flat recording coil 43 is deposited. At the step of making the recording coil, there are no structural steps for patterning the surface of the lower layer, such as the lower pole layer according to the related art, and the minuteness and precision of the coil pattern is achieved as desired.

The track width of magnetic recording is generally determined by the width with which the first portion 42a and the lower pole layer 37 counter at the ABS through the magnetic recording gap layer 41. In this embodiment, the flatness of the surface of the lower layer, such as the recording gap material layer 41, also achieves to precision of the pattern of the upper recording pole layer 42, and the pattern of the track width extending vertically to the sheet of FIG. 2 is as narrow and precise as predetermined.

FIGS. 4A, 4B, 4C, and 4D show a first example of the first aspect of the present invention, a method for manufacturing the magnetic recording-reproducing head shown by FIG. 2 and FIG. 3.

Figure 4A:
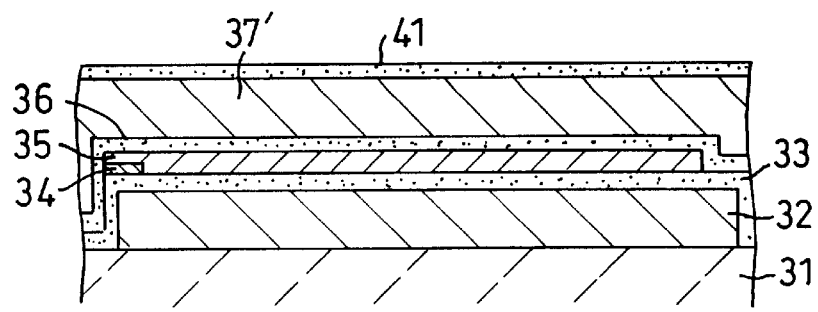
FIGS. 4A, 4B, 4C, and 4D are cross sectional views showing steps of making a magnetic recording-reproducing head according to the first aspect of the present invention.

First, a soft magnetic layer, such as NiFe or CdZnNi, is sputtered over the main surface of the non-magnetic substrate 31 whose surface is covered with non-magnetic layer made of $Al_2O_3$. Next, the soft magnetic layer is patterned as predetermined, and it acts as the lower magnetic shield layer 32. As shown in FIG. 4A, the lower magnetic reproducing gap layer 33, such as Si, $Al_2O_3$, SiO2, etc., is sputtered over the lower magnetic shield layer 32. The MR film 34 is then sputtered and patterned in the area that includes the ABS on the lower magnetic reproducing gap layer 33. The pair of lead electrodes made of conductive material, such as Cu,Al, W, etc., is sputtered and patterned to connect with the each end of the MR film 34 and to extend to the area at which the holes are predetermined. Then, as shown in FIG. 4A, the upper magnetic recording gap 36, soft magnetic layer 37' which is to be the upper magnetic shield layer, and the recording gap layer 41 are sputtered, in order, over the pair of lead electrodes 35, the MR film 34, and the lower magnetic reproducing layer 33.

Figure 4B:
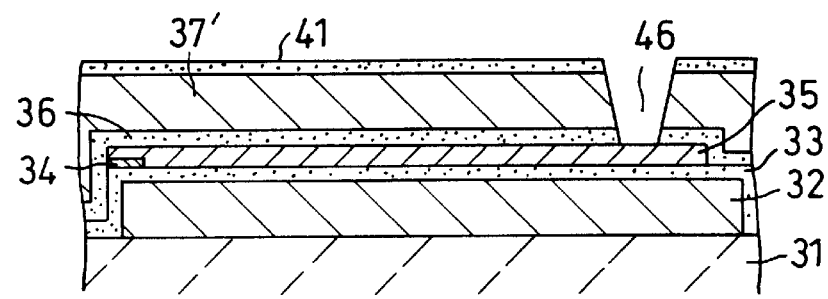

Then, as shown in FIG. 4B, the pair of holes 46,46' is dug by steps of PEP(Photo Etching Process) and Etching as RIE or Ion Milling, to the depth at which each one of the pair of lead electrodes 35 is exposed. The minimum diameter or width of one of the side of the hole is predetermined, for example, to about 5 $\mu$m, for the purpose of easy burial of the hole by next stop of spreading resist material which is to be plastered over the conductive material layer for the recording coil.

Figure 4C:
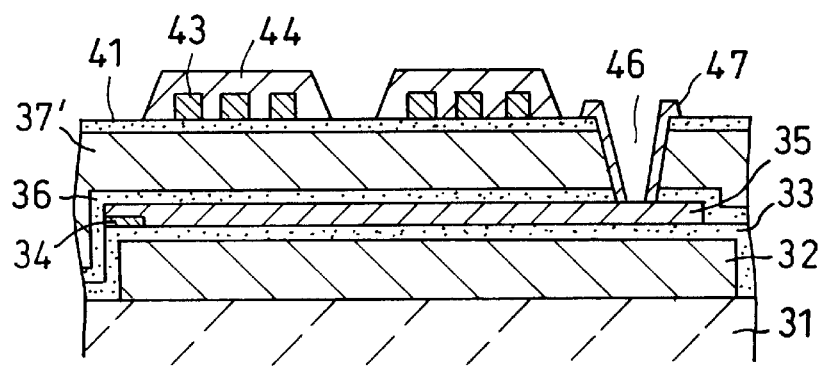

Then seed layer of conductive material for gilt, such as Cu,Al,W, etc., is sputtered on the magnetic recording gap layer 41. The resist layer is plastered on the conductive material layer, and simultaneously the pair of holes 46,46' is buried by the resist layer. After these steps, the surface of the plastered resist layer is flat, and the thickness of the plastered layer is thinner then the one of the related art. The thin and almost uniform thickness, and the flatness of the surface provide the preciseness and minuteness of the recording coil pattern. The resist pattern is made by PEP, and the recording coil 43 is made by gilt, as shown in FIG. 4C, using the resist flame pattern. After the resist flame pattern is removed by dissolution and the seed layer lower the flame pattern is removed, the insulator layer is plastered over the surface of the head on which the recording coil 43 and the pair of holes are made. Patterning for the coil insulator 44 and the side wall insulator 47,47' of the holes is done by steps of PEP and etching.

Figure 4D:
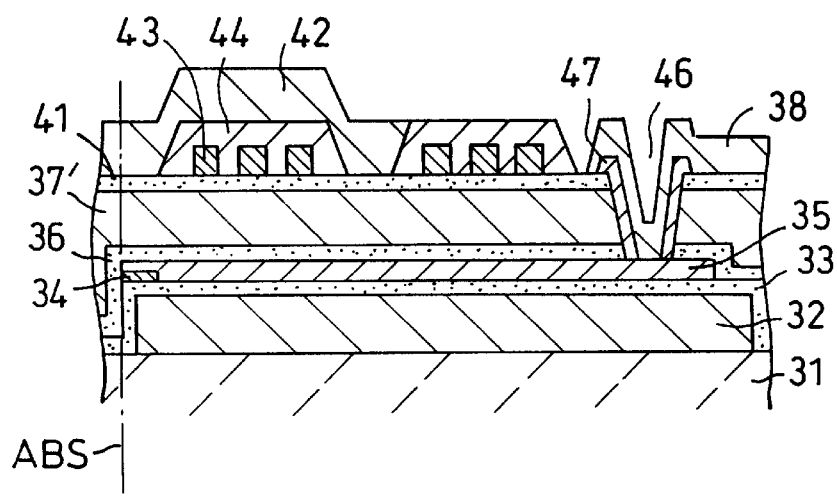

Then, the upper pole tip 42a and half portion of the upper pole 42b made of soft magnetic material, such as NiFe, and CdZnNi, are sputtered over the coil insulator 44 and patterned by the steps of PEP and etching. Simultaneously the pair of drawing electrodes 38,38' is sputtered and patterned to connect to each one of the lead electrode 35 through each hole, as shown in FIG. 4D.

The combined step of sputtering and patterning for the upper pole 42 and the pair of drawing electrodes lead to a reduction in the time and cost of manufacturing. The combined step applies to other examples shown hereafter.

The resist pattern for the upper pole layer 42 made by the PEP is precise and minute because the patterned steps whose altitude is more then 3 $\mu$m do not exist. Therefore, the preciseness of the pattern of the pole layer, especially pole tip 42a whose width mainly determines the track width, is highly attained.

In this embodiment, the sequence of the step of making the pair of holes 46,46', the insulator 47, and the pair of drawing electrodes 38,38' is variable in the steps to be adapted after the patterning of the upper pole layer 42. In this variation, the detail control of the width or the diameter of the pair of holes 46,46' and viscous rate of the resist are not strictly required. However, in this variation, insulators 47 of the side wall and the coil insulator 44 are made by different steps, and the pair of drawing electrodes and the upper pole layer 42 are made by other steps.

FIGS. 5A, 5B, 5C, and 5D show a second example of the first aspect of the present invention, the method for manufacturing the magnetic recording-reproducing head shown by FIG. 2 and FIG. 3.

The step of sputtering of a soft magnetic layer 32', the step of sputtering of lower magnetic reproducing gap layer 33, the steps of sputtering and patterning the MR film 34, the steps of sputtering and patterning the pair of lead electrodes 35, the step of sputtering of the upper magnetic recording gap 36, the step of sputtering the soft magnetic layer 37' to be the upper magnetic shield layer and the lower pole layer, and the step of sputtering the recording gap material layer 41, are carried out as described in the first example. In contrast with the first example, however, the patterning of the soft magnetic layer 32' is not performed, so the structural step of the pattern of the lower magnetic shield layer 32 does not exist in the surface of the magnetic recording gap layer 41, and the flatness of the surface of the magnetic recording gap layer 41 is attained more easily than in the first example. Then, resist patterns which form the resist flame pattern for gilt of the recording coil 43 are made by steps of PEP. The coil pattern 43 is made by gilt.

Figure 5A:
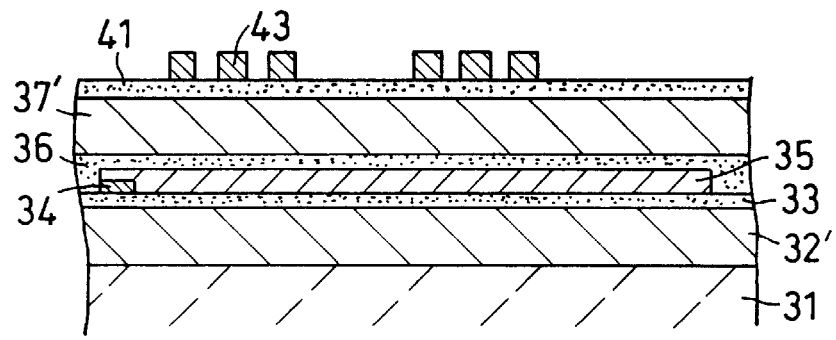
FIGS. 5A, 5B, 5C, and 5D comprise cross sectional views of a partial row of thin film magnetic head showing steps in the process of the second example for making a magnetic recording-reproducing head.
Figure 5B:
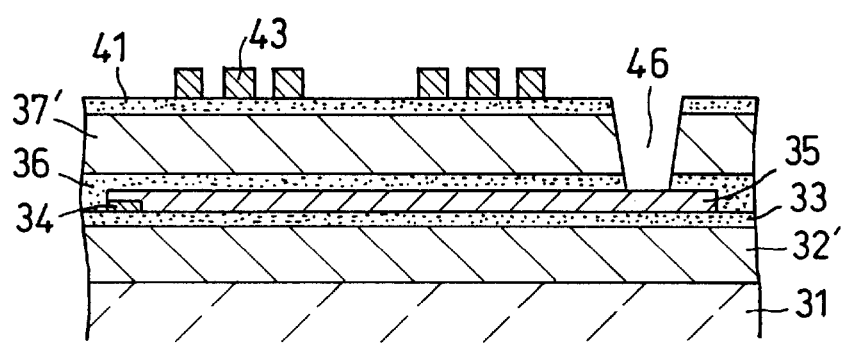
Figure 5C:
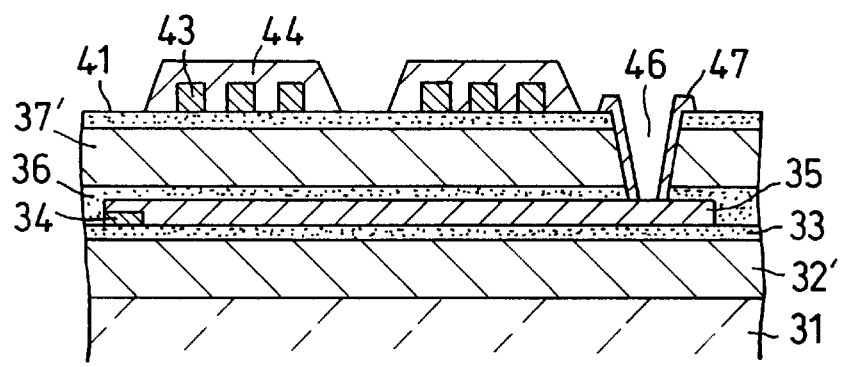

The pair of holes 46,46' are then dug through the magnetic recording gap layer 41 and the soft magnetic layer 37' and reproducing gap 36, as shown in FIG. 5B. Then, as shown in FIG. 5C, the coil insulator 44 is formed over the recording coil 43, and simultaneously, the insulator 47 attached to the side wall of the pair of the holes are made by CVD process, PEP, and Etching.

Figure 5D:
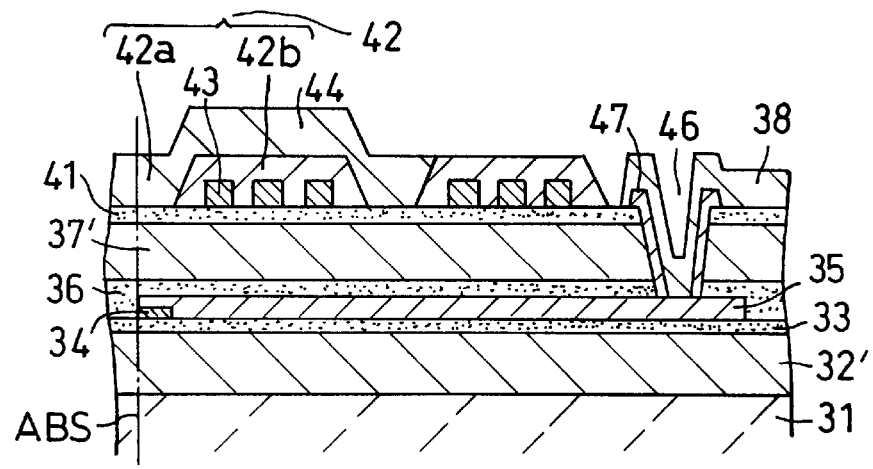

After these steps, the soft magnetic layer is sputtered and patterned to be the upper pole layer 42, and simultaneously, the pair of drawing electrodes 38,38' are made in the pair of the holes 46,46', as shown in FIG. 5D.

In this embodiment, the flatness of the surface of the recording gap material layer 41 on which the recording coil 43 is patterned is more obtainable than the method for manufacturing provided in the first example, because there is not structural step for the patterning of the lower magnetic shield layer 32'.

Figure 6A:
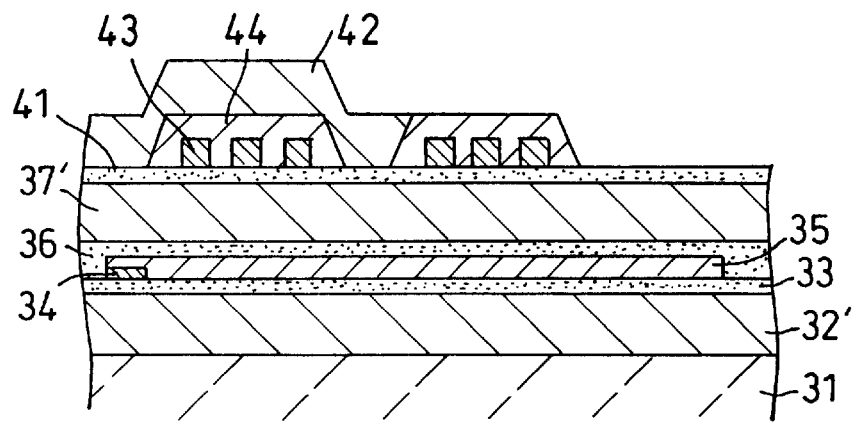
FIGS. 6A, 6B, and 6C comprise views of a thin film magnetic head showing steps in the process of the third example for making a magnetic recording-reproducing head.
Figure 6B:
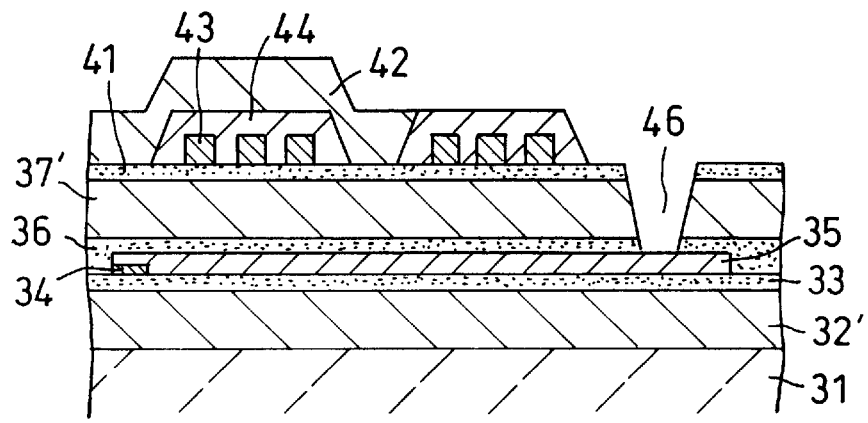
Figure 6C:
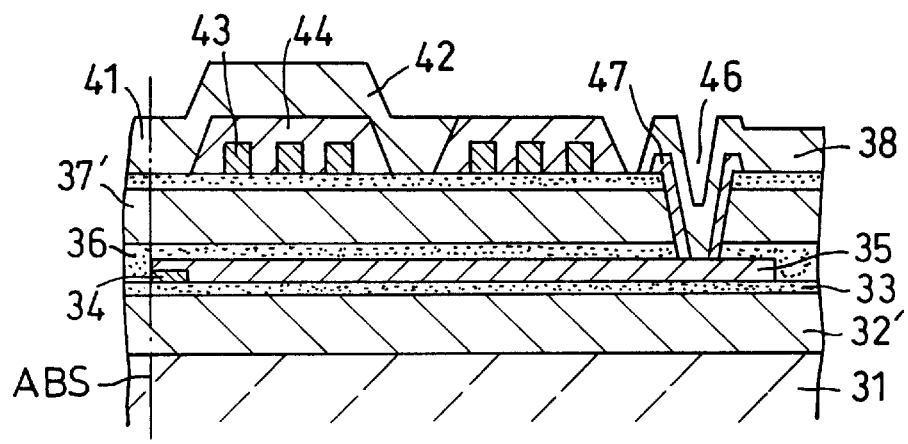

FIGS. 6A, 6B, and 6C show a variation of the second example.

In this variation, before the step to make the pair of holes 46,46', the insulator of the side walls 47,47', and the pair of drawing electrodes 38,38', the recording coil 43 and the upper pole layer 42 are made. The flatness of surface of lower layers on which the upper pole layer 42 is patterned is thus more obtainable.

Figure 7A:
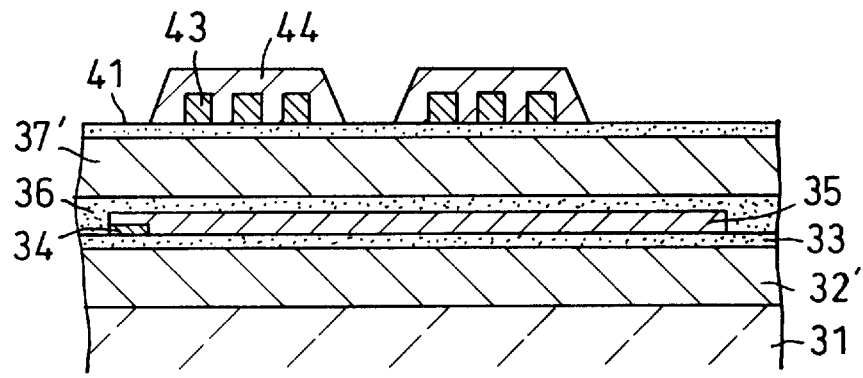
FIGS. 7A, 7B, and 7C comprise cross sectional views of a thin film magnetic head showing steps in the process of variation for making a magnetic recording-reproducing head according to the present invention.
Figure 7B:
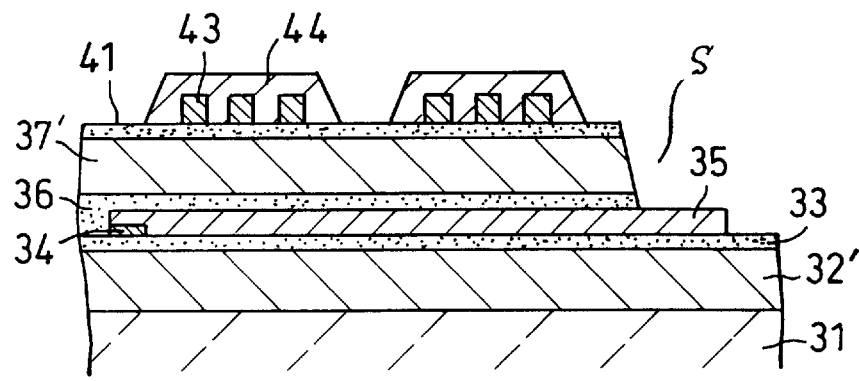
Figure 7C:
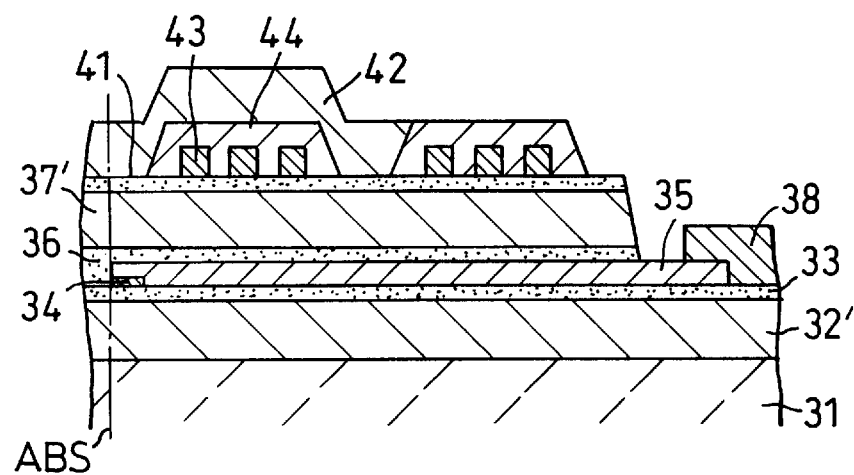

FIGS. 7A, 7B, and 7C show a third example of the first aspect of the present invention, a method for manufacturing the magnetic recording-reproducing head.

The step of sputtering of soft magnetic layer 32' over the main surface of non-magnetic substrate 31, the step of sputtering the lower magnetic reproducing gap layer 33, the steps of sputtering and patterning the MR film 34, the steps of sputtering and patterning the pair of lead electrodes 35, the step of sputtering the upper magnetic recording gap 36, the step of sputtering soft magnetic layer 37' to be the upper magnetic shield layer and the lower pole layer, and the step of sputtering the recording gap material layer 41,, are carried out as described in the first example. In contrast with the first example, the patterning of the soft magnetic layer 32' isn't carried. The structural step for the pattern of the lower magnetic shield layer 32 therefore does not exist in the surface of the recording gap material layer 41 on which the coil pattern 43 is deposited, and the flatness of the surface of the recording gap layer 41 is attained more easily than in the first example.

Then, the resist pattern made by a PEP which forms the resist flame pattern for the gilt of the recording coil 43 is formed on the flat layer, the recording gap material layer 41. The conductive coil 43 is made by a gilt process, and the coil insulator 44 and upper pole layer 42 are made, as shown in FIG. 6A, by the same process as described in the first example.

Then, as shown in FIG. 7B, the height of step S is made in the recessed region by PEP and etching to expose the pair of electrodes.

Then, the pair of drawing electrodes 38 are made to connect to each end of the lead electrodes, as shown in FIG. 7C.

In this embodiment, a flat surface on the recording gap material layer 41, on which the recording coil 43 is patterned is obtainable, because there is not structural step in the pattern of the lower magnetic shield layer 31 and the pair of holes 46,46' at the time of making the resist pattern and the upper pole layer 42.

Figure 9A:
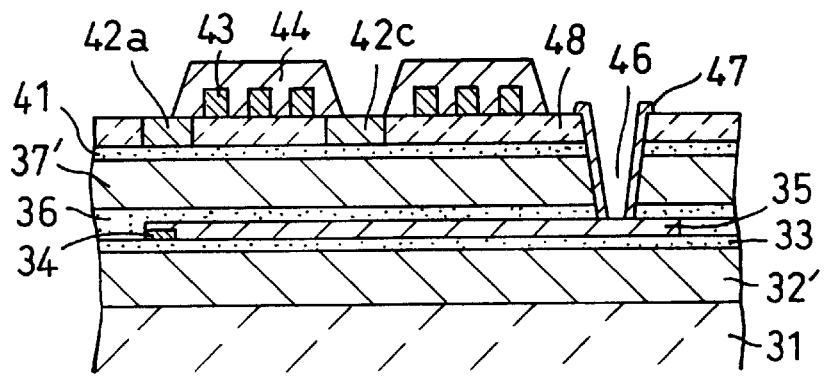
FIGS. 9A, and 9B comprise views of a partial row of thin film magnetic heads showing some parts of steps in the process of a fourth example for making magnetic recording-reproducing head.
Figure 9B:
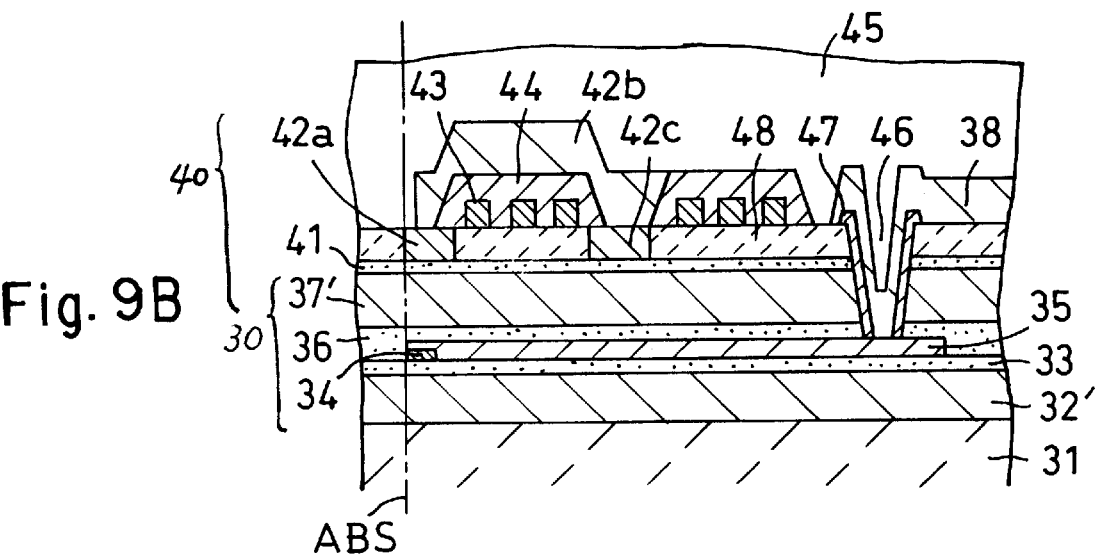

FIG. 9B shows a cross sectional view of the second example of the present invention, magnetic recording-reproducing head. This example comprises a shield type magnetic reproducing head 30 and a inductive type magnetic recording head 40 made over the reproducing head 30.

The shield type magnetic reproducing head 30 has the same composition as the first example described above.

The inductive type magnetic recording head 40 has an approximately the same composition as the first example described above. The main differences are in the structure of the upper pole layer 42, as shown in FIG. 9B. The upper pole structure comprises tip portion 42a which shapes the pole tip, mainly the extreme point of the extreme region including the ABS, the second portion of pole structure 42b extending as a yoke between the connecting part to the first portion of pole 42a and the connecting part to the third portion of pole structure 42c, and the third portion 42c located at the area receding from the ABS than the half portion of the recording coil 43. The first portion 42 a is surrounded by an insulator layer 48 horizontally which has portion defining trenches, cavities, notches, grooves, or apertures, in which the first portion and third portion are buried.

Figure 9C:
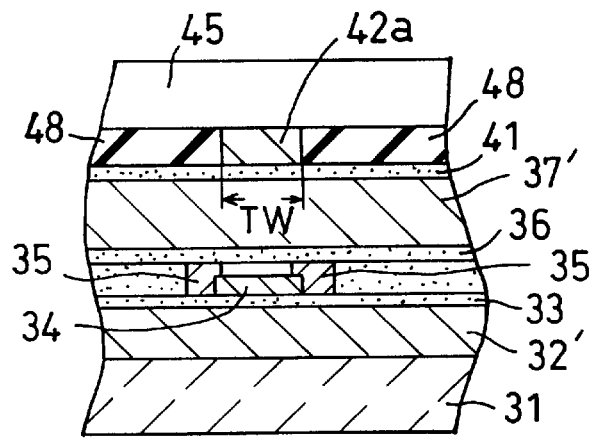
FIG. 9C is a sectional view of a second aspect of the present invention, a magnetic recording-reproducing head.

FIG. 9C shows a side view of the ABS of the second aspect of the present invention, the magnetic recording-reproducing head. The second portion of pole structure 42b is recessed from the ABS.

According to this second example of the second aspect of the present invention, the pattern of the first portion of the upper pole structure 42a is more precise and minute than the first example shown in FIG. 2 and FIG. 3.

FIGS. 8A, 8B, 8C, 9A, 9B show a fourth example of the first aspect of the present invention, the method for manufacturing the magnetic recording-reproducing head.

The step of sputtering of the soft magnetic layer 32' over the main surface of the non-magnetic substrate 31, the step of sputtering of the lower magnetic reproducing gap layer 33, the steps of sputtering and patterning of the MR film 34, the steps of sputtering and patterning the pair of lead electrodes 35, the step of sputtering the upper magnetic recording gap 36, the step of sputtering soft magnetic layer 37' to be the upper magnetic shield layer and the lower pole layer, and the step of sputtering the recording gap material layer 41, are carried out as described in the first example of the method for manufacturing.

Then, the magnetic layer which is made of high saturation magnetization material is sputtered on the recording gap material layer 41, and the first portion 42a and the third portion 42c is patterned by PEP process and etching process such as Ion Milling or RIE. At this step, the resist pattern for the first portion is thin and the surface of the resist pattern is flat, resulting from the flatness of the lower layer 41. The pattern of the first portion 42a is therefore precise and minute.

Figure 8A:
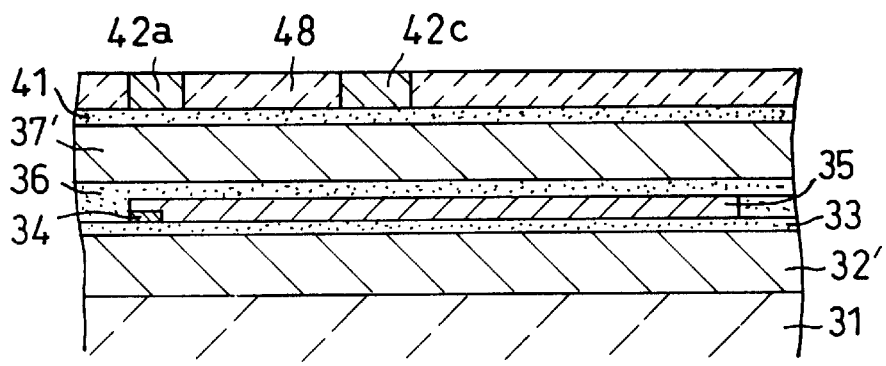
FIGS. 8A, 8B, and 8C comprise cross sectional views of a thin film magnetic head showing some part of steps in the process of a fourth example for making a magnetic recording-reproducing head according to the present invention.

Then the insulator layer is sputtered or deposited, and its surface is etched back or polished until its surface matches with the surface of the first and third portion, and those surfaces are plane, as shown in FIG. 8A.

As a substitute for making the first and the third portion 42a, 42c, a gilt process using a seed layer sputtered on the recording gap material 41 can be adaptable in other examples.

As a substitute for making the first portion and the third portion of the pole structure, and the insulator layer 48, the two portions 42a, 42c are made by sputtering of the magnetic material and the PEP process, the insulator layer 48 is deposited and polished, or etched back to have a plane surface.

Figure 8B:
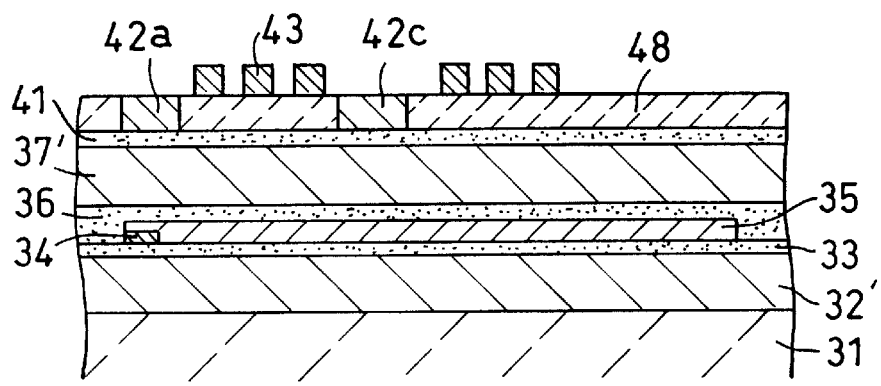

Then, as shown in the FIG. 8B, the next step is to deposit the recording coil 43 on the flat surface of the first and the third portion 42a, 42c, and the insulator layer 48 by the process described in the first example.

Figure 8C:
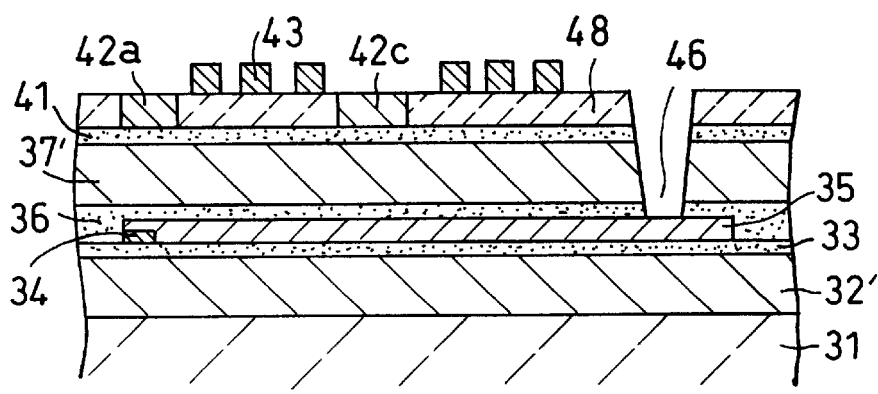

Then, as shown in FIG. 8C, the pair of holes for the drawing electrode 46 is made through the insulator 48, recording gap layer 41, and soft magnetic layer 37' by the same process as described in the first embodiment.

Then, as shown in FIG. 9A, the insulator layer 47 and the coil insulator 44 are made as described in the first embodiment.

As shown in FIG. 9B, the second portion of the pole structure 42b and the pair of drawing electrodes made of conductive soft magnetic layer are then sputtered and patterned as predetermined, and the head covered with an insulator layer for protection 45 is polished until the ABS is exposed.

The track width of recording is defined by Tw shown in FIG. 9C.

For making the flatter surface of the recording gap material layer 41, a process of etching resin, which coats over the soft magnetic material layer 37' by spinning the wafer and the soft magnetic material layer 37' by milling with an angle of incidence being about 40° at same speed is adaptable. A step to bake the resin made of a low number of molecule material at about 473° C. is adapted to flatten the surface of the resin. By these processes, the structural step originated in the step between the surface of the MR film 34 and the lead electrodes 35,35' is reduced to about 5 nm~10 nm, and this process sequence is adaptable to other examples.

Figure 10A:
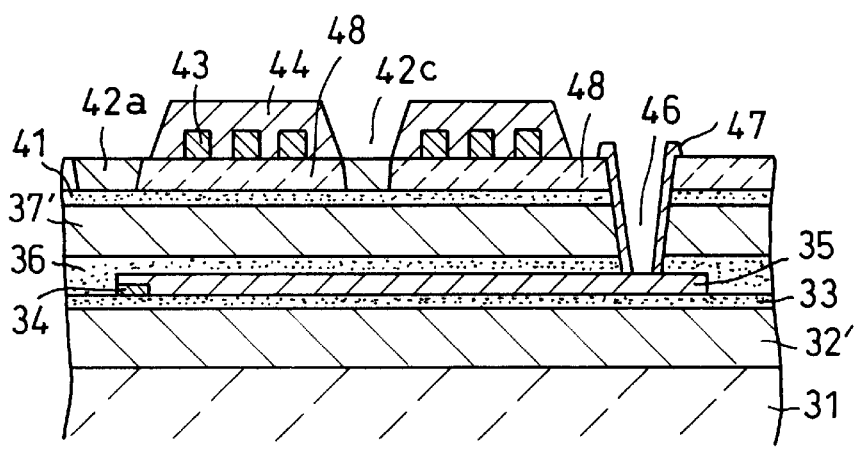
FIGS. 10A, and 10B comprise views of a partial row of thin film magnetic heads showing steps in the process of variation for making magnetic recording-reproducing head.
Figure 10B:
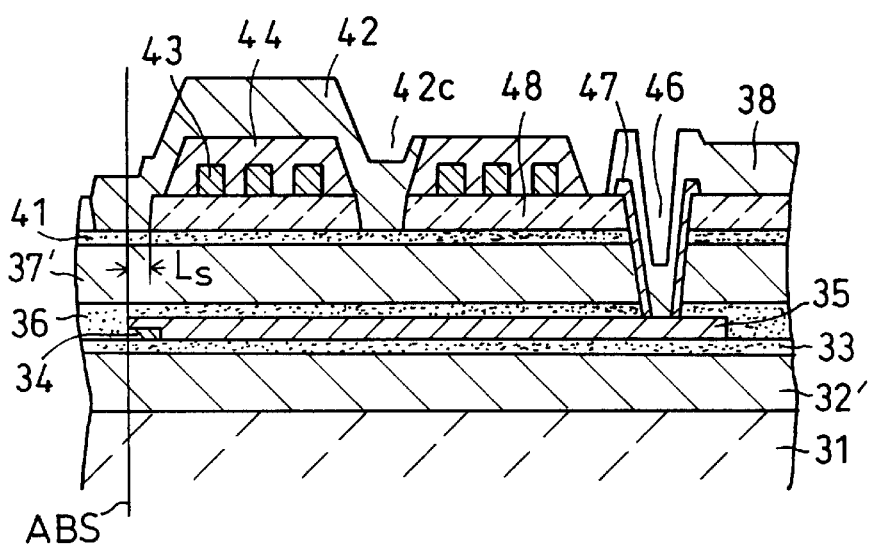

FIGS. 10A, 10B show the essential elements of a variation of the second example of the magnetic recording-reproducing head, as the best mode of the present invention. The differences are in the location and the throat height of the upper pole structure. The throat height Ls is defined by the length between the ABS to the insulator layer 48, and the shortness of the height contributes to the efficiency of recording. Other elements also contribute to obtain shortening of the height.

Figure 11A:
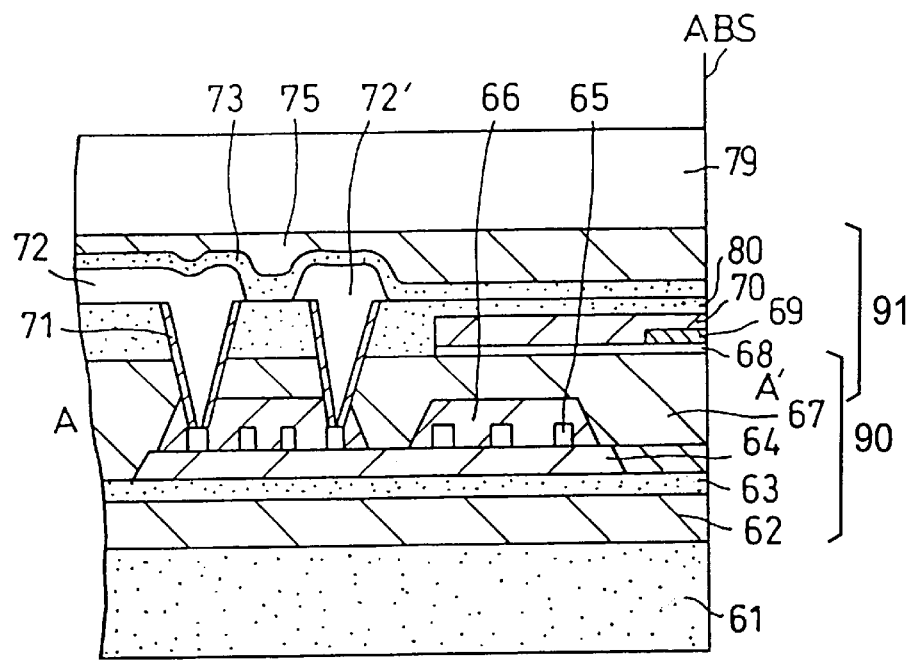
FIG. 11A is a cross sectional view of a third example of the second aspect, of a magnetic recording-reproducing head.
Figure 11B:
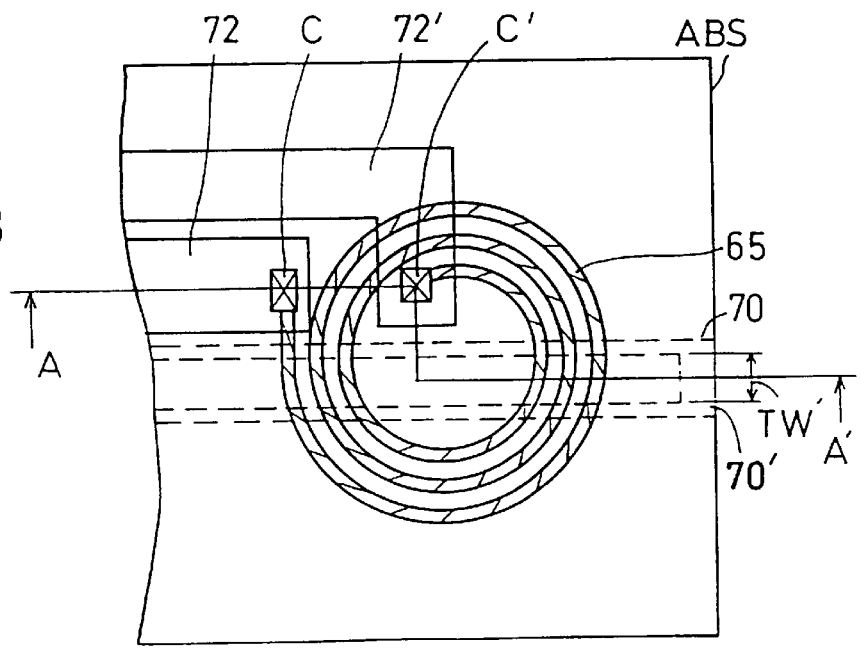
FIG. 11B is a plan view showing the relative relation of the locations of some elements in the first example, and a plan view of a specific embodiment of a magnetic recording-reproducing head.

FIGS. 11A and 11B show the third example of the second aspect of the present invention, the magnetic recording-reproducing head.

In this embodiment, the magnetic reproducing head 91 is formed over the recording head 90 which is formed over the $Al_2O_3$.TiC substrate 61 covered with a non-magnetic material layer like $Al_2O_3$, which is different from the other examples. The magnetic recording head 90 comprises lower pole layer 62, recording gap material layer 63, insulator layer 64 possessing an aperture at the tip region including the ABS, and the recording coil 65 of conductive material on the insulator layer 64, coil insulator covering the coil 65, upper pole layer 67 which works simultaneously as the lower shield layer, and the electrodes 72,72' connecting electrically to the coil 65. The magnetic reproducing head 91 comprises the lower shield layer 67, lower reproducing gap material layer 68, MR film 69, a pair of lead electrodes 70,70' connecting to each end of the MR film 69, upper reproducing gap material layer 80, and the upper shield layer 75. The track width of the reproducing head 91 is equal to the width of the sensing part of the MR film determined by the width of the pair of electrodes. A pair of holes for drawing electrodes 72,72' connecting to the each end of the recording coil 65 is made at a part recessed from the ABS through the lower shield layer with its side wall being covered with an insulator layer 71.

In this example, the surface on which the pair of lead electrodes 70,70' is patterned is flat enough because the surface has no step resulting from the pattern of electrodes connecting to the coil 65.

FIGS. 12A, 12B, 12C, and 12D show the fifth example of the first aspect of the present invention, a method for manufacturing the magnetic recording-reproducing head, and one example of manufacturing the head shown in the FIGS. 11A and 11B.

Figure 12A:
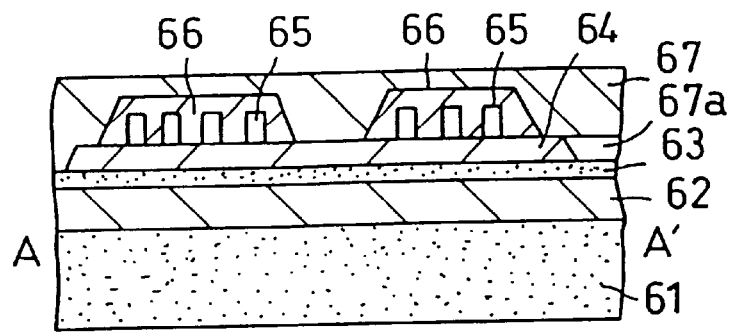
FIGS. 12A, 12B, 12C, and 12D comprise cross sectional views of a thin film magnetic head, showing steps of the process of the fifth example for making a magnetic recording-reproducing head.

The method for manufacturing the essential elements of the magnetic recording head, as shown in FIG. 12A, is executed using the same process as described in the above examples.

Figure 12B:
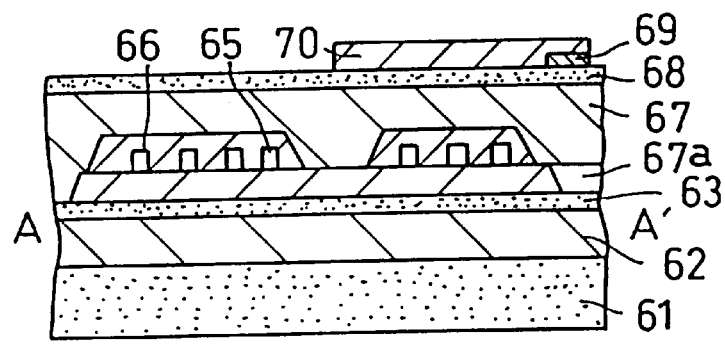

Then, as shown in FIG. 12B, on the surface of the lower magnetic shield layer 67, the recording gap material layer 68 is plastered or deposited, and the MR film 69 is sputtered and patterned on the surface of the recording gap material layer 68. The pair of the lead electrodes 70,70' is sputtered and patterned by PEP process and etching to connect to each end of the MR film 69. The width between the electrodes defines the track width. In this example there is no step resulted from the electrodes for the coil 65, and the minute pattern of the lead electrodes are obtained.

Figure 12C:
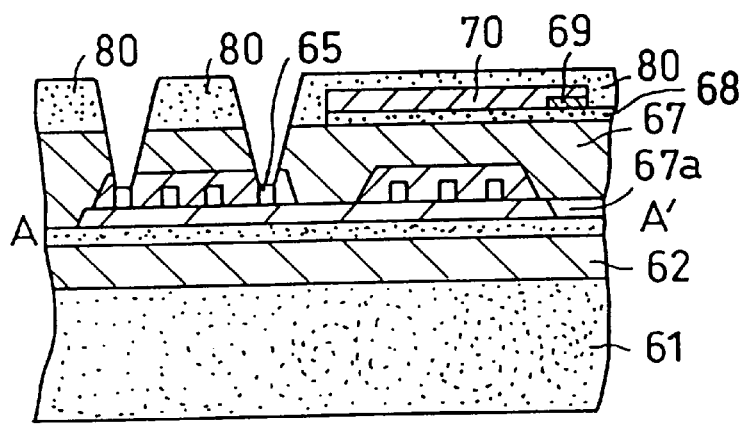

Then, gap material layer 80 is plastered or deposited over the lead electrodes 70,70', MR film 69, and the lower gap material layer 68, as shown in FIG. 12C. The pair of holes is dug to expose each end of the coil 65, as shown in FIG. 12C.

Figure 12D:
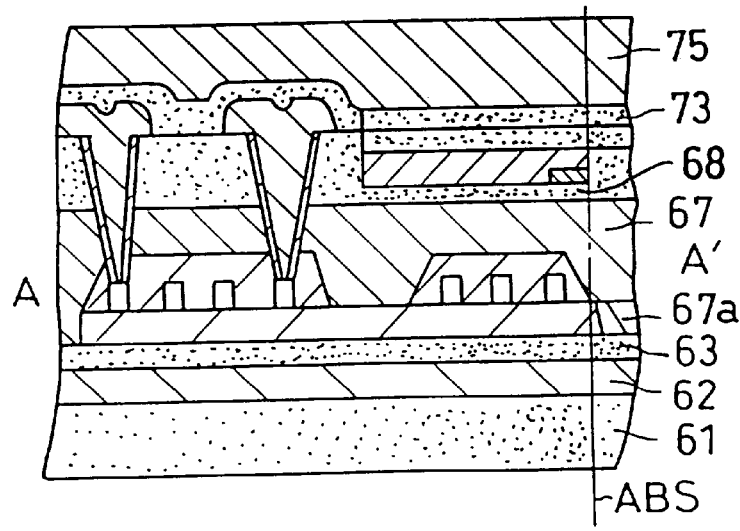

Then the drawing electrodes 72,72' are sputtered in the holes and patterned as shown in FIG. 12D. The upper shield layer 73 and the protective insulator layer 75 is then plastered on the head.

In the present invention, an MR film and the pair of lead electrodes form an MR element. An MR film is made of MR material, such as AMR material whose electrical resistance is affected and changes by the relative angle of the direction of the magnetic moment and the electric current like Ni80Fe20, or spin valve GMR which comprises the magnetic layer, a non-magnetic layer, and another magnetic layer, another GMR material made of artificial lattice, CMR (Colossal MR), and granular GMR.

Figure 13A:
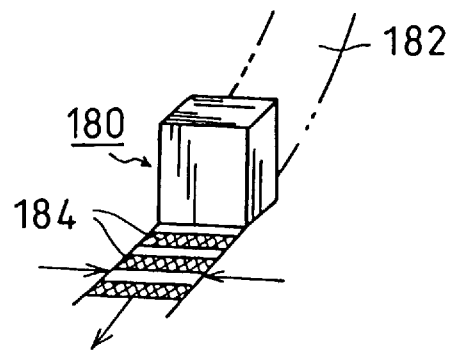
FIG. 13A is a plan view of the trailing end of an alternate embodiment of a magnetic head slider according to the present invention.

FIG. 13A shows the relation of the magnetic recording-reproducing head 180, the recorded pattern 184 on the magnetic medium 182, and the relative direction of the progression of the medium 182.

Figure 13B:
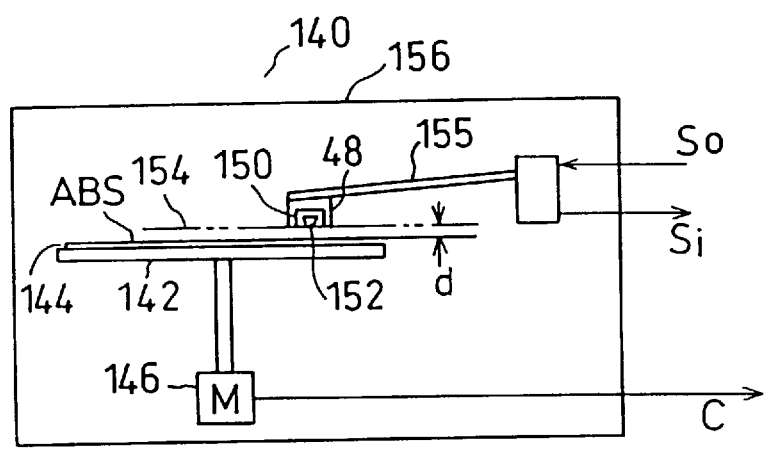
FIG. 13B shows the composition of the magnetic recording-reproducing reproducing device and loaded magnetic recording-reproducing head according to the present invention.

FIG. 13B shows a magnetic recording-reproducing device loaded with the magnetic recording-reproducing head 152 according to the present invention. A magnetic disk 144 is placed on the supporting board 142, which is rotated by the motor 146 controlled by the signal C. The magnetic head 150 is attached to the head suspension assembly 155 which transmits input signal Si and output signal So and is controlled to float at the distance d or contact the disk 144.

What is claimed is:

1. A composite magnetic head comprising:

a first magnetic head having a first electrode;

a first conductive layer disposed above the first electrode and having a portion defining a hole that extends to the first electrode;

a second magnetic head disposed above the first magnetic head a second electrode coupled to the first electrode through the portion; and;

an insulator layer disposed between sidewalls of the hole of the portion and the second electrode.

2. The composite magnetic head according to claim 1, wherein the first magnetic head is a reproducing head and comprises an MR film coupled to the first electrode, the first electrode of the first magnetic head comprises a pair of lead electrodes, and the second magnetic head is a recording head and has a recording coil and a lower pole structure comprising the first conductive layer.

3. The composite magnetic head according to claim 2, wherein the recording head further comprises an upper pole structure, one of the upper and lower pole structures has a first body of a pole tip to an Air Bearing Surface (ABS) and a second body, the second body being wider in a direction of track width than the first portion, and being magnetically coupled to the first body.

4. The composite magnetic head according to claim 3, wherein the second body is recessed further from the ABS than the first body.

5. The composite magnetic head according to claim 3, wherein the first body has a first surface facing the ABS and a second surface opposite to the first surface, and the recording head further comprises a coil insulator layer covering the recording coil, the coil insulating layer being disposed further from the ABS than the second surface.

6. The composite magnetic head according to claim 3, wherein the first body is provided in a notch structure made of a nonmagnetic layer.

7. The composite magnetic head according to claim 3, wherein the width of the first body is less than 0.8 $\mu$m.

8. The composite magnetic head according to claim 2, wherein the MR film is disposed closer to an Air Bearing Surface than the portion.

9. The composite magnetic head according to claim 2, wherein the recording coil is formed above a planar surface.

10. The composite magnetic head according to claim 2, wherein the recording coil is disposed on a planar surface, and the portion extends from the planar surface to the first electrode.

11. The composite magnetic head according to claim 2, wherein the recording coil is disposed on a surface, and a flatness of the surface is less than the thickness of the first conductive layer.

12. The composite magnetic head according to claim 1, wherein the first magnetic head is a recording head and comprises a recording coil and an upper pole structure comprising the first conductive layer, the first electrode is coupled to the [end portions of the] recording coil, and the second magnetic head is a reproducing head comprising an MR film and a pair of lead electrodes.

13. The composite magnetic head according to claim 12, wherein the MR film is disposed closer to an Air Bearing Surface than the portion.

14. The composite magnetic head according to claim 1, wherein one of the first magnetic head and the second magnetic head is a reproducing head and comprises a first magnetic layer, a second magnetic layer adjacent to the first magnetic layer, and a nonmagnetic layer disposed between the first magnetic layer and the second magnetic layer.

15. A composite magnetic head comprising:

a first magnetic head having a first electrode;

a first conductive layer disposed above the first electrode;

a second magnetic head disposed above the first magnetic head and having a recording coil formed above a planar surface, wherein a portion of the first conductive layer defines one of a hole, an aperture and a step that extends from the planar surface to the first electrode; and a second electrode coupled to the first electrode through the portion.

* * * * *

UNITED STATES PATENT AND TRADEMARK OFFICE
CERTIFICATE OF CORRECTION

PATENT NO.: 5,912,790

DATED: June 15, 1999

INVENTOR(S): Yoda et al.

It is certified that an error appears in the above-identified patent and that said Letters Patent is hereby corrected as shown below:

Title page, Item [73], in the Assignee, line 1, delete "Kawaski" and insert --Kawasaki--.

Claim 1, column 11, line 19, after "head" insert --;--.

Claim 3, column 11, line 34, after "tip" insert --adjacent--.

Claim 12, column 12, line 23, before "recording" delete "[end portions of the]".

Signed and Sealed this

Eleventh Day of January, 2000

Attest:

Attesting Officer

Q. TODD DICKINSON

Acting Commissioner of Patents and Trademarks